United States Patent
Uemura et al.

(10) Patent No.: US 7,635,975 B2
(45) Date of Patent: Dec. 22, 2009

(54) ABSOLUTE MULTI-REVOLUTION ENCODER

(75) Inventors: Koji Uemura, Fukuoka (JP); Shirou Yoshidomi, Fukuoka (JP); Takafumi Goto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 388 days.

(21) Appl. No.: 11/597,197

(22) PCT Filed: May 11, 2005

(86) PCT No.: PCT/JP2005/008597

§ 371 (c)(1),
(2), (4) Date: Mar. 6, 2007

(87) PCT Pub. No.: WO2005/114111

PCT Pub. Date: Dec. 1, 2005

(65) Prior Publication Data

US 2008/0272834 A1 Nov. 6, 2008

(30) Foreign Application Priority Data

May 21, 2004 (JP) ............................ 2004-151273
Nov. 25, 2004 (JP) ............................ 2004-340637

(51) Int. Cl.
G01B 7/30 (2006.01)
H01L 43/08 (2006.01)
(52) U.S. Cl. ............................ 324/207.25; 324/207.21
(58) Field of Classification Search .............. 324/207.2, 324/207.21, 207.22, 207.25, 160, 173, 174, 324/178, 179
See application file for complete search history.

(56) References Cited

FOREIGN PATENT DOCUMENTS

| JP | 5-079853 A | 3/1993 |
| JP | 6-18281 A | 1/1994 |
| JP | 6-062322 U | 9/1994 |
| JP | 9-273943 A | 10/1997 |

OTHER PUBLICATIONS

Chinese Office Action dated Mar. 21, 2008.

Primary Examiner—Kenneth J Whittington
(74) Attorney, Agent, or Firm—Sughrue Mion, PLLC

(57) ABSTRACT

Magnetic field detection elements and detect a magnetic material member formed at a rotary disc. An A pulse generation portion and a B pulse generation portion generate an A pulse a and a B pulse b which phases differ by 90 degrees to each other. The B pulse generation portion is supplied with the power from a backup power supply for a predetermined time period necessary for detecting the level of the B pulse from a time point of the edge of the A pulse.

5 Claims, 6 Drawing Sheets

ABSOLUTE MULTI-REVOLUTION ENCODER

TECHNICAL FIELD

The present invention relates a multi-revolution detection circuit for an encoder which detects the multi-revolution amount of a rotary member and, in particular, relates to an absolute multi-revolution encoder realizing the power saving.

RELATED ART

The absolute multi-revolution encoder is required to maintain the counting state of a multi-revolution amount and to always detect and store the multi-revolution amount even if power is not supplied from an external power supply. A backup power supply, for supplying power to a circuit when not supplied from the external power supply, is required to reduce a consumption current as small as possible thereby to elongate the life time of the backup power supply.

To this end, for example, there has been employed a method in which a power to be supplied to an element used for a detection circuit, in particular, an LED having a large consumption current is fed in a pulsation manner at the time of operating a backup power supply thereby to reduce a consumption current.

FIG. 10 is a side view showing the mechanical configuration of an absolute multi-revolution encoder of a related art. In the figure, a reference numeral 50 depicts a rotary disc and 51 an optical slit pattern formed at the rotary disc 50. Further, a reference numeral 70 depicts an LED, 71 a lens and 72 a light receiving element. These three elements constitute an optical detecting means for detecting rotation positional information from the optical slit pattern 51. A reference numeral 60 depicts another rotary disc, 61 a magnetic material member formed on the rotary disc, and 62 a magnetoresistive element for detecting the magnetic material member 61.

FIG. 11 is a plan view showing the configuration of the rotary discs 50 and 60. The magnetic material member 61 is provided over a predetermined angular range near an origin including the origin position of the optical slit pattern 51 formed at the rotary disc 50.

Next, the operation will be explained.

When the power is supplied from the external power supply, the LED 70 is continuously fed and the optical detecting means including the LED 70 detects a position within one revolution from the optical slit pattern 51 formed at the rotary disc 50 thereby to update a not-shown counter at the origin position to detect a multi-revolution amount. Upon the backup operation where the external power supply is cut off and power is supplied from the backup power supply, the magnetoresistive element 62 detects the magnetic material member 61 formed at the rotary disc 60 when passing the origin, whereby the LED 70 is fed by the backup power supply for a predetermined time period determined by a rising edge and a falling edge respectively corresponding to the end portions of the magnetic material member 61 of an origin near signal generated by a not-shown circuit. It is determined, from a rotation position detection signal obtained when the LED 70 is fed, whether or not the rotary disc passes the origin position and also determining the rotation direction when it is determined that the rotary disc passes the origin position.

In this manner, upon the backup operation, the LED is fed by the backup power supply for the predetermined time period necessary for determining, from the rotation position detection signal, whether or not the rotary disc passes the origin position and also determining the rotation direction when it is determined that the rotary disc passes the origin position, whereby the reduction of the consumption current and the elongation of the life time of the backup power supply are intended (see patent document 1, for example).

Patent Document 1: JP-A-5-79853

DISCLOSURE OF THE INVENTION

Problems to be Solved by the Invention

The absolute multi-revolution encoder of the related art requires to feed power to the LED having a large consumption current even for a short time in order to detect a multi-revolution amount. Thus, there is a limit to reduce the consumption current, which is a large obstacle to realize the elongation of the life time of the backup power supply.

The invention is made in view of the aforesaid problem of the related art and an object of the invention is to provide an absolute multi-revolution encoder which can realize to largely elongate the life time of a backup power supply.

Means for Solving the Problems

In order to solve the aforesaid problem, the invention is configured in the following manner.

According to claim 1, there is provided with an absolute multi-revolution encoder including:

a rotary disc;

a multi-revolution signal generation portion; and a within-one-revolution signal generation portion, wherein the rotary disc includes a magnetic material member which generates a multi-revolution signal, and the multi-revolution signal generation portion includes:

an A-phase magnetic field detection element and a B-phase magnetic field detection element which detect leakage fluxes of the magnetic material member and output signals of one pulse/revolution having phases different by 90 degrees therebetween, an A-pulse generation portion including an A-phase detection portion which detects a signal from the A-phase magnetic field detection element and an A-pulse generation circuit which converts the detected signal into an A pulse of a rectangular wave shape, a B-pulse generation portion including a B-phase detection portion which detects a signal from the B-phase magnetic field detection element and an B-pulse generation circuit which converts the detected signal into a B pulse of a rectangular wave shape, a counter which counts the A pulse and the B pulse to generate the multi-revolution signal, and a power supply means which supplies power from a backup power supply for a predetermine time period to at least one of the B-phase detection portion and the B-pulse generation circuit based on the A pulse or to at least one of the A-phase detection portion and the A-pulse generation circuit based on the B pulse.

According to claim 2, it is characterized in that at least one of the A-phase magnetic field detection element and the B-phase magnetic field detection element is an MR element.

According to claim 3, there is provided with an absolute multi-revolution encoder including:

a rotary disc;

a multi-revolution signal generation portion; and a within-one-revolution signal generation portion, wherein the rotary disc includes a magnetic material member which generates a multi-revolution signal, the magnetic material member is formed of a permanent magnetic which is magnetized along a direction perpendicular to a rotation axis of the rotary disc, and the multi-revolution signal generation portion includes:

an A-phase magnetic field detection element and a B-phase magnetic field detection element which detect leakage fluxes of the magnetic material member and output signals of one pulse/revolution having phases different by 90 degrees therebetween, an A-pulse generation portion including an A-phase detection portion which detects a signal from the A-phase magnetic field detection element and an A-pulse generation circuit which converts the detected signal into an A pulse of a rectangular wave shape, a B-pulse generation portion including a B-phase detection portion which detects a signal from the B-phase magnetic field detection element and an B-pulse generation circuit which converts the detected signal into a B pulse of a rectangular wave shape, a counter which counts the A pulse and the B pulse to generate the multi-revolution signal, a T-phase magnetic field detection element which detects leakage fluxes of the magnetic material member and outputs a signal of two pulses/revolution, a T-pulse generation portion including a T-phase detection portion which detects a signal from the T-phase magnetic field detection element and a T-pulse generation circuit which converts the detected signal into a T pulse of a rectangular wave shape, and a power supply means which supplies power from a backup power supply for a predetermine time period to either one of the A-phase detection portion, the B-phase detection portion and the A-pulse generation circuit, the B-pulse generation circuit based on the T pulse.

According to claim 4, it is characterized in that each of the A-phase magnetic field detection element and the B-phase magnetic field detection element is a Hall element, and the T-phase magnetic field detection element is an MR element.

According to claim 5, it is characterized in that a circuit board is disposed in parallel to the rotary disc via a gap, the A-phase magnetic field detection element and the B-phase magnetic field detection element are mounted on the rotary disc side of the circuit board, and the T-phase magnetic field detection element is mounted on a side of the circuit board in opposite to the rotary disc side.

EFFECTS OF THE INVENTION

According to the invention claimed in claims 1 and 2, the multi-revolution signal generation portion is configured by a magnetic detection means having a small consumption current, and one of the A-pulse generation portion and the B-pulse generation portion is fed in a pulsation manner at the time of the cut-off of the external power supply, so that a consumption current can be reduced. Thus, the elongation of the life time of the backup power supply can be realized and the maintenance. can be simplified. Further, when an MR element is used for the magnetic field detection element, a consumption current can be further reduced.

According to the invention claimed in claims 3 and 4, the multi-revolution signal generation portion is configured by a magnetic detection means having a small consumption current, and the A-pulse generation portion and the B-pulse generation portion are fed in a pulsation manner at the time of the cut-off of the external power supply based on the T pulse of two pulses/revolution, so that a consumption current can be reduced. Thus, the elongation of the life time of the backup power supply can be realized and the maintenance can be simplified. Further, when an MR element is used for the T-phase magnetic field detection element, a consumption current can be further reduced.

According to the invention claimed in claim 5, since the magnetic fields extending perpendicular to the circuit board and the magnetic fields extending in parallel to the circuit board from a magnetizing portion are used as a detection signal, an allowable value of the setting of a gap between the circuit board and the rotary disc can be made large. Further, when the elements are selected and disposed on the main and rear surfaces of the circuit board so as to match to the sensitive direction of the elements, a small-sized absolute multi-revolution encoder can be obtained.

Figure 1:
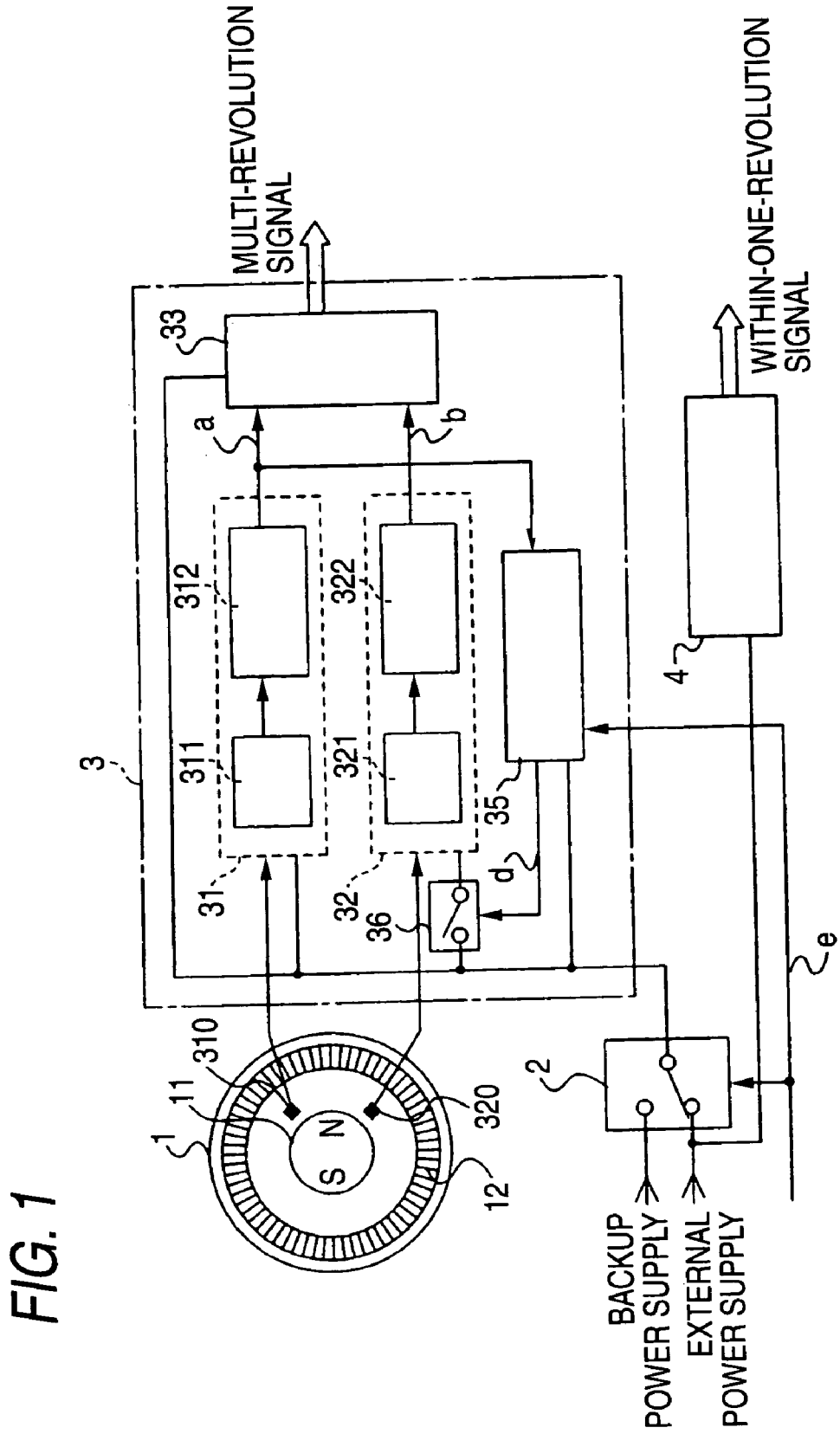
FIG. 1 illustrates a block diagram showing the multi-revolution detection circuit of an absolute multi-revolution encoder according to the first embodiment of the invention.

EXPLANATION OF REFERENCE NUMERALS 1 rotary disc
11 disc magnet
12 optical slit
2 power supply selection switch
3 multi-revolution signal generation portion 31 A-pulse generation portion
310 A-phase magnetic field detection element
311 A-phase detection portion
312 A-pulse generation circuit
32 B-pulse generation portion
320 B-phase magnetic field detection element
321 B-phase detection portion
322 B-pulse generation circuit
33 counter
34 T-pulse generation portion
340 T-phase magnetic field detection element
341 T-phase detection portion
342 T-pulse generation circuit
35 power supply control pulse generation circuit
36 feeding control portion
4 within-one-revolution signal generation portion
5 circuit board

BEST MODES FOR CARRYING OUT THE INVENTION

Hereinafter, embodiments according to the invention will be explained with reference to drawings.

First Embodiment

FIG. 1 is a block diagram showing the multi-revolution detection circuit of an absolute multi-revolution encoder according to the first embodiment of the invention.

In the figure, a reference numeral 1 depicts a rotary disc, 2 a power supply selection switch, 3 a multi-revolution signal generation portion and 4 a within-one-revolution signal generation portion.

A disc magnet 11, serving as a magnetic material member for generating a multi-revolution signal, is attached to the rotary disc 1. Further, optical slits 12 for generating a within-one-revolution signal is formed at the rotary disc. The disc magnet 11 is formed in a manner that a pair of magnets N, S are directed perpendicular to a rotation shaft. Further, a reference numeral 310 depicts an A-phase magnetic field detection element and 320 depicts a B-phase magnetic field detection element. These magnetic field detection elements are disposed to oppose to the rotary disc 1 via a gap so as to have an angular difference of 90 degrees therebetween. As magnetic field detection element, an MR element is used as the A-phase magnetic field detection element 310 and a Hall element is used as the B-phase magnetic field detection element 320.

In the multi-revolution signal generation portion 3, a reference numeral 31 depicts an A-pulse generation portion which is constituted by an A-phase detection portion 311 for detecting a signal from the magnetic field detection element 310 and an A-pulse generation circuit 312 for converting an output from the A-phase detection portion 311 into a signal of a rectangular wave shape (A pulse). Further, a reference numeral 32 depicts a B-pulse generation portion which is constituted by a B-phase detection portion 321 for detecting a signal from the magnetic field detection element 320 and a B-pulse generation circuit 322 for converting an output from the B-phase detection portion 321 into a signal of a rectangular wave shape (B pulse). Further, a reference numeral 33 depicts a counter for generating a multi-revolution signal from the A pulse signal and the B pulse signal. Furthermore, reference numerals 35 and 36 depict a feeding means for feeding in a pulsation manner, in which a reference numeral 35 depicts a power supply control pulse generation circuit for generating a signal with a predetermined pulse width which starts from the edge of the A pulse signal or the B pulse signal, and 36 depicts a feeding control portion for feeding in a pulsation manner based on the signal from the power supply control pulse generation circuit 35.

The first embodiment of the invention differs from the related art in the following point.

In the relate art, in the case of detecting the multi-revolution in the off state of the external power supply, a multi-revolution amount is detected in accordance with the combination of the signals from the optical means for detecting a within-one-revolution signal by using the LED and the magnetic means for detecting the neighborhood of the origin position in a manner that the LED is fed from the backup power supply only for a time period necessary for detecting the multi-revolution amount, thereby reducing the consumption current. In contrast, in this embodiment, a multi-revolution amount is detected not by using an optical means but by counting the A pulse signal and the B pulse signal obtained from a magnetic detection means in a manner that one of the A-pulse generation portion and the B-pulse generation portion is fed in a pulsation manner from the backup power supply only for a time period necessary for detecting the multi-revolution amount, thereby reducing the consumption current.

Next, the operation of the first embodiment of the invention will be explained.

First, explanation will be made as to the case where power is fed from the external power supply.

In FIG. 1, when the rotary disc 1 rotates, the disc magnet 11 rotates together with the rotary disc 1. The A-phase detection portion 311 and the B-phase detection portion 312 detect magnetic fields of the disc magnet 11 by the A-phase magnetic field detection element 310 and the B-phase magnetic field detection element 320 and supply detected signals to the A-pulse generation circuit 312 and the B-pulse generation circuit 322, respectively. The A-pulse generation circuit 312 and the B-pulse generation circuit 322 amplify input signals by not-shown amplifiers and convert the amplified signals by not-shown comparators into the A pulse and the B pulse each being a two-phase rectangular wave signal, respectively. Each of the A pulse and the B pulse is a signal with a duty ratio of 50% and one pulse/one revolution, and the A pulse and the B pulse have a phase difference of 90 degree therebetween.

Figure 2:
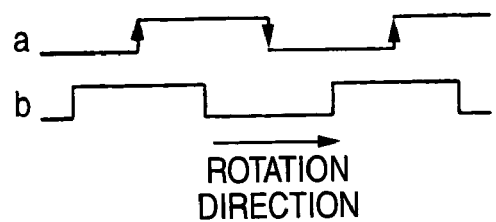
FIGS. 2(a) and 2(b) illustrate waveform diagrams at the respective portions of the multi-revolution detection circuit in the first embodiment of the invention (at the time of supplying power from an external power supply).
Figure 2:
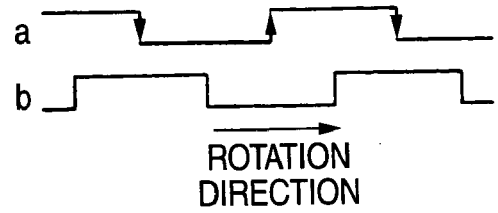

FIG. 2 is diagrams showing waveforms at the respective portions of the multi-revolution detection circuit in the case of being fed from the external power supply in the first embodiment of the invention, and shows the waveforms of the A pulse and the B pulse when the rotary disc 1 rotates at a constant speed. FIG. 2(a) shows the waveforms at the time of the rotation in the forward direction and FIG. 2(b) shows the waveforms at the time of the rotation in the reverse direction, in which a depicts the A pulse and b depicts the B pulse. As shown in FIG. 2(a), at the time of the rotation in the forward direction, the B pulse b becomes an H level upon the rising edge of the A pulse a. In this case, the counter 33 performs the calculation of "multi-revolution amount data +1" to count up the multi-revolution amount data. As shown in FIG. 2(b), at the time of the rotation in the reverse direction, the B pulse b becomes the H level upon the falling edge of the A pulse a. In this case, the counter 33 performs the calculation of "multi-revolution amount data −1" to count down the multi-revolution amount data. In this manner, in the case of being fed from the external power supply, the power is continuously fed to all the circuits of the multi-revolution signal generation portion 3 thereby to generate the multi-revolution signal.

Next, the explanation will be made as to the backup operation in which the external power supply is cut off and the power is fed from the backup power supply.

In FIG. 1, at the time of the cut-off of the external power supply such as a power failure, the power supply selection switch 2 is switched to the backup power supply side in accordance with a power supply switching signal e supplied from a not-shown detection circuit when the voltage of the external power supply reduces to a predetermined voltage or less. When the power supply is switched to the backup power supply side, the power is not supplied to the within-one-revolution signal generation portion 4 and the power is supplied only to the multi-revolution signal generation portion 3 from the backup power supply. Further, when the power supply control pulse generation circuit 35 detects the edge of the A pulse, this circuit generates a power supply control pulse d with a predetermined pulse width which is generated so as to start from the edge thereby to restrict the power supply to the B-pulse generation portion 32. That is, although the A-pulse generation portion 31 is continuously fed by the backup power supply, the B-pulse generation portion 32 is supplied via the feeding control portion 36 with the pulsation power which is restricted by the power supply control pulse d.

Figure 3:
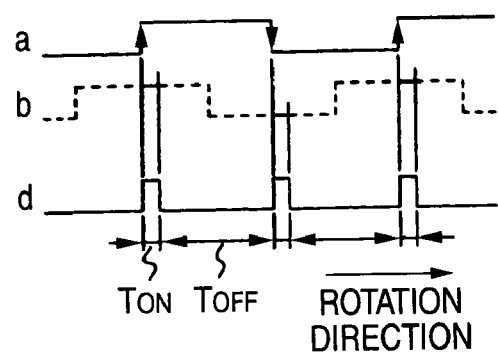
FIGS. 3(a) and 3(b) illustrate waveform diagrams at the respective portions of the multi-revolution detection circuit in the first embodiment of the invention (at the time of the backup operation).
Figure 3:
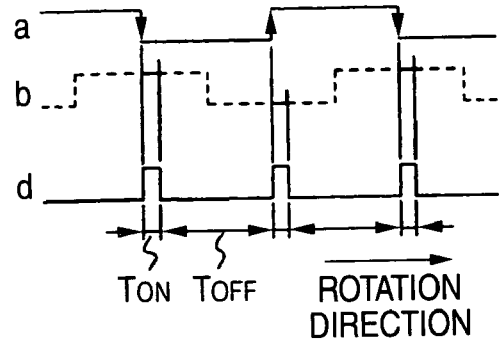

FIG. 3 is diagrams showing waveforms at the respective portions of the multi-revolution detection circuit at the time of the backup operation in the first embodiment of the invention.

FIG. 3(a) shows the waveforms at the time of the rotation in the forward direction and FIG. 3(b) shows the waveforms at the time of the rotation in the reverse direction, in which the A pulse a, the B pulse b and the power supply control pulse d when the rotary disc 1 rotates at a constant speed are shown. A TON period during which the power supply control pulse d is at an H level is a period during which the power from the backup power supply is supplied to the B-pulse generation portion 32. A TOFF period is a period during which the power from the backup power supply is not supplied to the B-pulse generation portion 32. Thus, the B pulse b is fixed at its level only during the TON period shown by a steady line. when the counter 33 detects the edge of the A pulse a, the counter detects the level of the B pulse b during the TON period thereby to update the count value thereof. The up and down operation of the count value is performed in the similar manner as the case where the power is fed from the external power supply. That is, at the time of the rotation in the forward direction, the B pulse becomes an H level upon the rising edge of the A pulse. In this case, the counter performs the calculation of "multi-revolution amount data +1" to count up the multi-revolution amount data. At the time of the rotation in the reverse direction, the B pulse becomes an H level upon the falling edge of the A pulse. In this case, the counter 33 performs the calculation of "multi-revolution amount data –1" to count down the multi-revolution amount data. The power supply control pulse d may have a pulse width sufficient for detecting the H/L levels of the B pulse.

In this manner, according to this embodiment, at the time of the backup operation, the power from the backup power supply is fed only to the multi-revolution signal generation portion 3, whilst the B-pulse generation portion 32 is supplied with the power from the backup power supply only during the predetermined period (TON period) necessary for detecting the level of the B pulse. Thus, the consumption current at the time of the backup operation can be reduced. Accordingly, the life time of the backup power supply can be elongated and the maintenance can be simplified. Further, the cost of the maintenance required for exchanging the backup power supply such as a battery can be reduced.

Although, in this embodiment, the explanation is made as to an example in which each of the B-phase detection portion 321 and the portion 322 within the B-pulse generation portion 32 is fed in a pulsation manner, either one of the B-phase detection portion 321 and the portion 322 may be fed in a pulsation manner.

Second Embodiment

Figure 4:
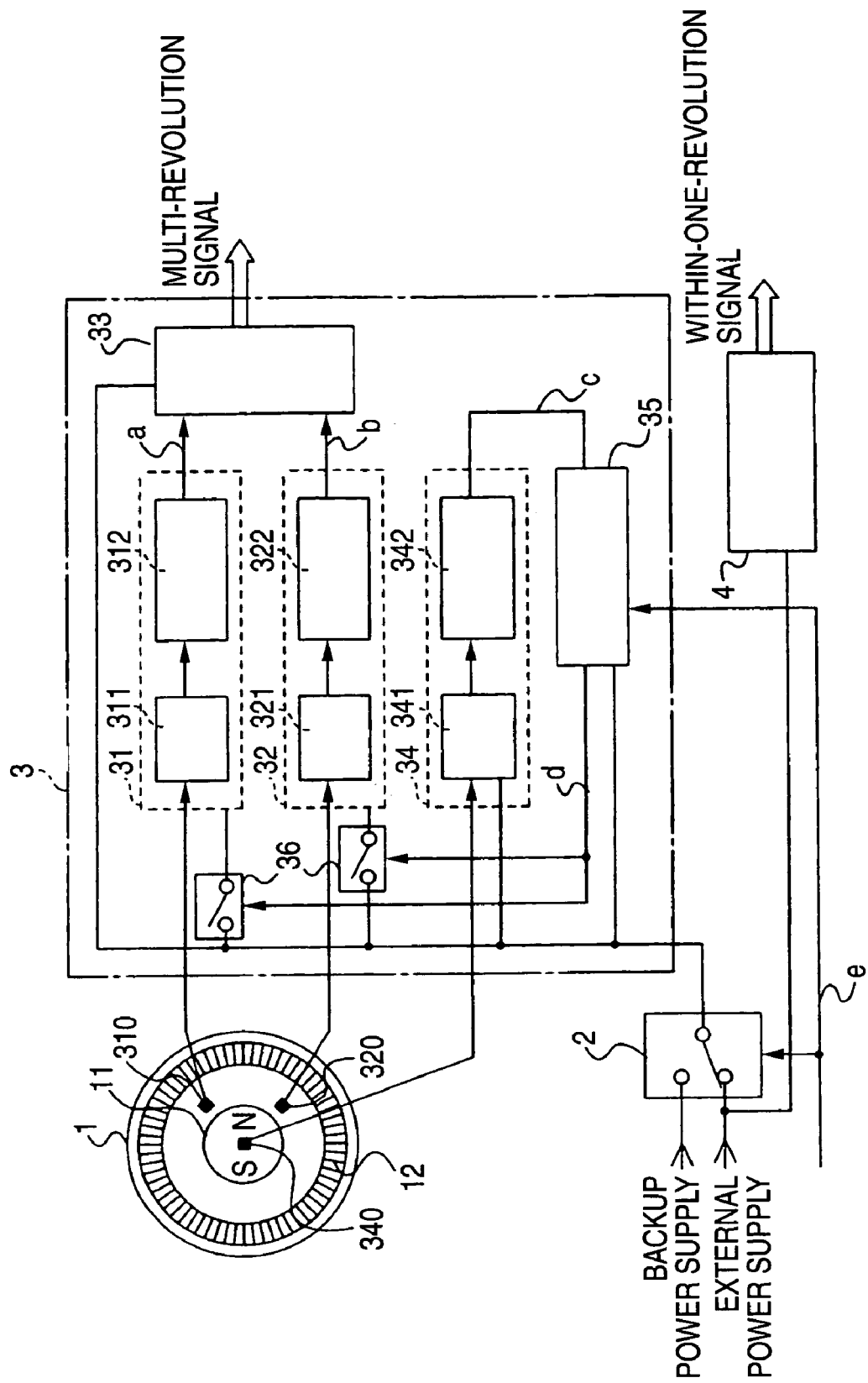
FIG. 4 illustrates a block diagram showing the multi-revolution detection circuit of an absolute multi-revolution encoder according to the second embodiment of the invention.

FIG. 4 is a block diagram showing the multi-revolution detection circuit of an absolute multi-revolution encoder according to the second embodiment of the invention. In this embodiment, portions having the same configurations as those of the first embodiment omitted in their explanation and only the portions different from the first embodiment will be explained.

In FIG. 4, a reference numeral 340 depicts a T-phase magnetic field detection element for outputting a signal of two pulses/revolution. A reference numeral 34 depicts a T-pulse generation portion which is configured by a T-phase detection portion 341 for detecting the output from the T-phase magnetic field detection element and a T-pulse generation circuit 342 for converting an output from the T-phase detection portion 341 into a signal of a rectangular wave shape (T-pulse).

Figure 5:
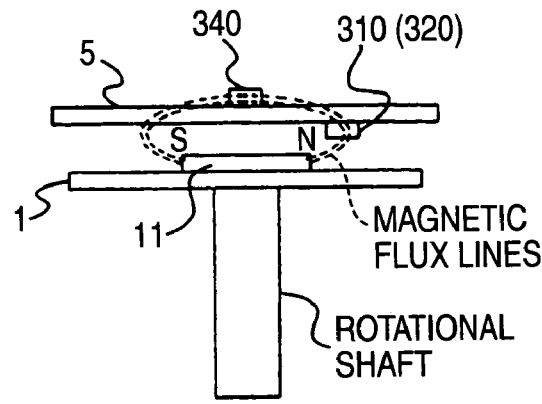
FIG. 5 illustrates a side view showing the arrangement of magnetic field detection elements according to the second embodiment of the invention.
Figure 6:
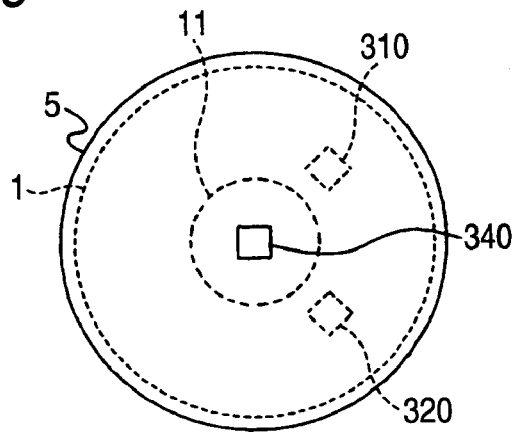
FIG. 6 illustrates a plan view showing the arrangement of magnetic field detection elements according to the second embodiment of the invention.

FIG. 5 is a side view showing the arrangement of the magnetic field detection elements according to the second embodiment of the invention and FIG. 6 is a plan view thereof.

In these figures, a reference numeral 5 depicts a circuit board. The A-phase magnetic field detection element 310 and the B-phase magnetic field detection element 320 are disposed on the surface of the circuit board 5 on the rotary disc 1 side, whilst the T-phase magnetic field detection element 340 are disposed on the surface of the circuit board 5 in opposite to the rotary disc 1 side. A reference numeral 6 depicts magnetic field lines, which represent a state of the magnetic fields when magnetic poles are disposed at the left and right sides in the figure, respectively. The magnetic field extending in the direction perpendicular to the circuit board 5 interlinks with the A-phase magnetic field detection element 310 and the B-phase magnetic field detection element 320, whilst the magnetic field extending in parallel to the circuit board 5 interlinks with the T-phase magnetic field detection element 340.

In this embodiment, the Hall element having the detection sensitivity with respect to the magnetic field extending in the direction perpendicular to the circuit board 5 is used for each of the A-phase magnetic field detection element 310 and the B-phase magnetic field detection element 320, whilst the MR element having the detection sensitivity with respect to the magnetic field extending in parallel to the circuit board 5 is used for the T-phase magnetic field detection element 340.

This embodiment differs from the first embodiment in the following point.

In the first embodiment, the consumption current is reduced in a manner that the power from the backup power supply is supplied in a pulsation manner to one of the A-pulse generation portion and the B-pulse generation portion only during the time period necessary for detecting a multi-revolution amount. In contrast, in this embodiment, the consumption current is reduced in a manner that the T-phase magnetic field detection element 340 for outputting the signal of two pulses/revolution is disposed on the circuit board, the T pulse signal for controlling the supply of the power is generated based on the signal obtained from the T-phase magnetic field detection element 340, and the power from the backup power supply is supplied in a pulsation manner to the A-pulse generation portion 31 and the B-pulse generation portion 32 only during the time period necessary for detecting a multi-revolution amount from the time point starting from the edge of the T pulse.

Next, the operation of the second embodiment of the invention will be explained.

Figure 7:
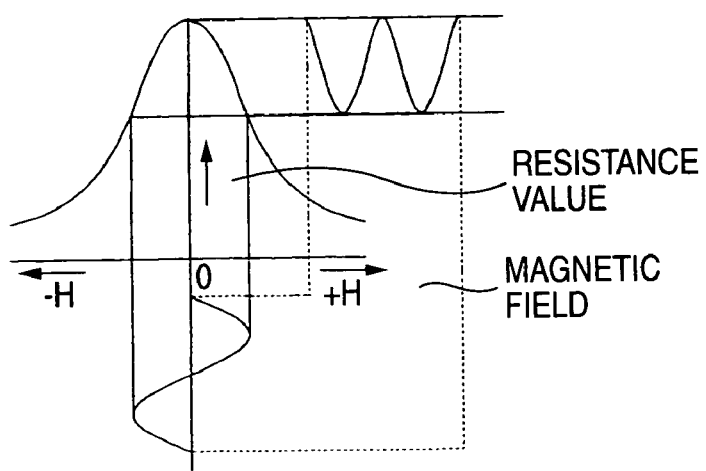
FIG. 7 illustrates a graph showing the characteristics of an MR element according to the second embodiment of the invention.

FIG. 7 is a graph showing the characteristics of the MR element used as the T-phase magnetic field detection element 340. The resistance value of the element changes cyclically twice each time the rotary disc 1 rotates by one revolution. The T-phase detection portion 341 shown in FIG. 4 detects this resistance change and supplies a detection signal to the T-pulse generation circuit 342. The T-pulse generation circuit 342 amplifies the input signal by a not-shown amplifier and converts the amplified signal by a not-shown comparator into the T pulse. The T pulse is the signal of two pulses/one revolution.

First, the explanation will be made as to the operation of the multi-revolution signal generation portion 3 in the case where the power is supplied from the external power supply.

Figure 8:
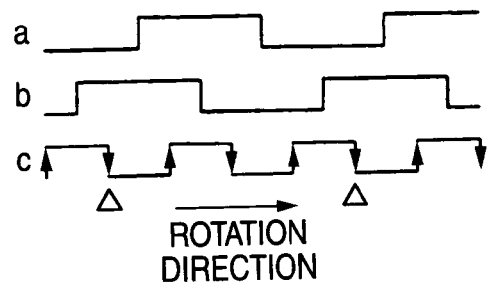
FIGS. 8(a) and 8(b) illustrate waveform diagrams at the respective portions of the multi-revolution detection circuit in the second embodiment of the invention (at the time of supplying power from an external power supply).
Figure 8:
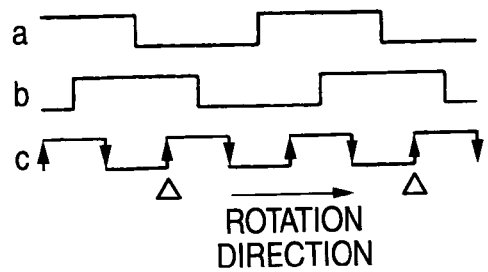

FIG. 8 is diagrams showing waveforms at the respective portions of the multi-revolution detection circuit in the second embodiment of the invention. FIG. 8(a) shows the waveforms at the time of the rotation in the forward direction and FIG. 8(b) shows the waveforms at the time of the rotation in the reverse direction, in which a depicts the A pulse, b depicts the B pulse and c depicts the T pulse.

At the time of the rotation in the forward direction as shown in FIG. 8(a), upon the falling edge of the T pulse c, there arises a state (Δ point) that the A pulse a is at an L level and the B pulse b is at an H level. Under this condition, the counter 33 performs the calculation of "multi-revolution amount data +1" to count up the multi-revolution amount data. As shown in FIG. 7(b), at the time of the rotation in the reverse direction, upon the rising edge of the T pulse c, there arises a state (Δ point) that the A pulse a is at the L level and the B pulse b is at the H level. Under this condition, the counter 33 performs the calculation of "multi-revolution amount data −1" to count down the multi-revolution amount data.

Next, the explanation will be made as to the operation of the multi-revolution signal generation portion 3 at the time of the backup operation.

In FIG. 4, when the power supply is switched to the backup power supply side at the time of the cut-off of the external power supply such as a power failure, the power is not supplied to the within-one-revolution signal generation portion 4 and the power from the backup power supply is applied only to the multi-revolution signal generation portion 3. Further, the power is supplied in a pulsation manner from the backup power supply to the A-pulse generation portion 31 and the B-pulse generation portion 32. That is, the power supply control pulse generation circuit 34 generates the power supply control pulse d with the predetermined pulse width which is generated so as to start from the edge of the T pulse c. Then, the feeding control portion 36 supplies, based on the power supply control pulse d, the power from the backup power supply to the A-pulse generation portion 31 and the B-pulse generation portion 32 only during the period that the power supply control pulse d is at the H level.

Figure 9:
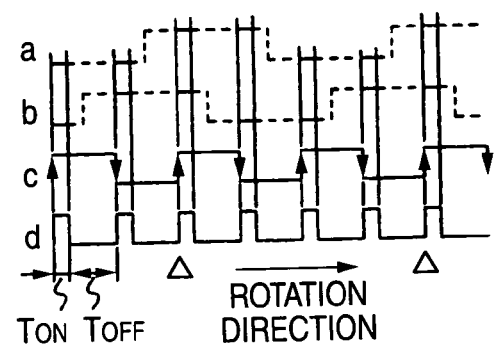
FIGS. 9(a) and 9(b) illustrate waveform diagrams at the respective portions of the multi-revolution detection circuit in the second embodiment of the invention (at the time of the backup operation).
Figure 9:
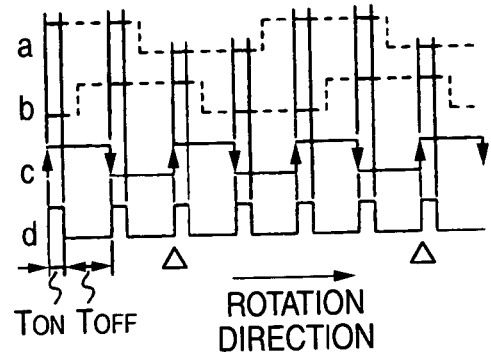
Figure 10:
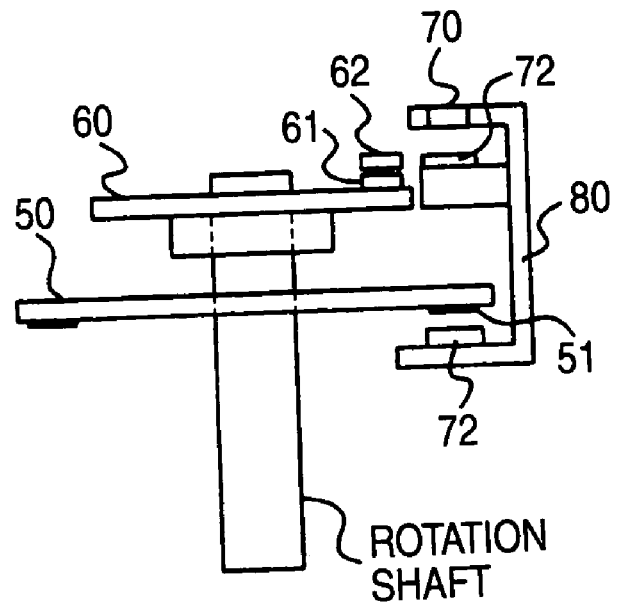
FIG. 10 illustrates a side view showing the mechanical configuration of an absolute multi-revolution encoder of a related art.
Figure 11:
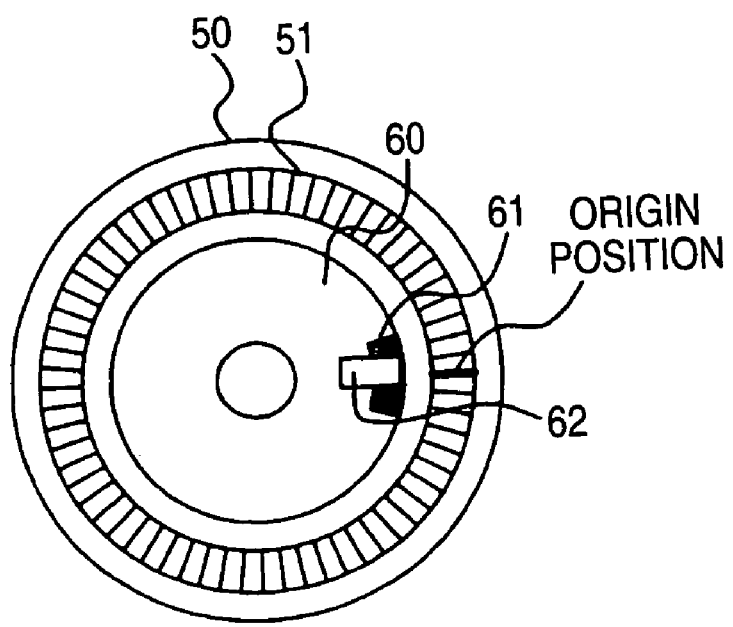
FIG. 11 illustrates a plan view showing the configuration of the rotary discs of the absolute multi-revolution encoder of a related art.

FIG. 9 is diagrams showing waveforms at the respective portions of the multi-revolution detection circuit at the time of the backup operation in the second embodiment of the invention.

FIG. 9(a) shows the waveforms at the time of the rotation in the forward direction and FIG. 9(b) shows the waveforms at the time of the rotation in the reverse direction, in which a depicts the A pulse, b depicts the B pulse, c depicts the T pulse and d depicts the power supply control pulse. A TON period represents a time period during which the power from the backup power supply is supplied to the A-pulse generation portion 31 and the B-pulse generation portion 32, whilst a TOFF period represents a time period during which the power is not supplied. Thus, the A pulse a and the B pulse b are fixed at their levels only during the TON period shown by steady lines.

The counter 33 detects the edge of the T pulse during the TON period and then detects the levels of the A pulse a and the B pulse b during the TON period thereby to increment or decrement the count value thereof. The counting operation of the counter 33 is same as the case where the power is supplied from the external power supply. That is, at the time of the rotation in the forward direction, upon the falling edge of the T pulse c, there arises a state (Δ point) that the A pulse is at an L level and the B pulse is at an H level. Then, the counter 33 performs the calculation of "multi-revolution amount data +1". At the time of the rotation in the reverse direction, upon the rising edge of the T pulse c, there arises a state (Δ point) that the A pulse a is at the L level and the B pulse b is at the H level. Then, the counter 33 performs the calculation of "multi-revolution amount data −1". The count value is not changed in each of the conditions other than the aforesaid conditions as to the A pulse and the B pulse at the edge of the T pulse.

In this manner, according to this embodiment, at the time of the backup operation, the power from the backup power supply is fed only to the multi-revolution signal generation portion 3, whilst the A-pulse generation portion 31 and the B-pulse generation portion 32 are supplied with the power from the backup power supply only during the predetermined period of the TON period necessary for detecting the levels of the A pulse and the B pulse and not supplied with the power during the TOFF time period. Thus, the consumption current of the backup power supply can be reduced. Accordingly, the life time of the backup power supply can be elongated and the maintenance can be simplified. Further, the cost of the maintenance required for exchanging the backup power supply such as a battery can be reduced.

Further, the Hall elements and the MR element are used for the detection of the multi-revolution signal and these elements are disposed so as to detect the magnetic fields extending in the direction perpendicular to the circuit board and the magnetic fields extending in parallel to the circuit board. Thus, the degree of freedom of the setting of the gap between the rotary disc and the Hall elements disposed so as to oppose to each other in the axial direction, that is, the circuit board can be made large. Thus, the setting of the gap can be optimized on the optical detection means side for generating the within-one-revolution signal.

Although, in this embodiment, the explanation is made as to an example in which each of the A-pulse generation portion 31 and the B-pulse generation portion 32 is fed in a pulsation manner, the A-phase detection portion 311, the B-phase detection portion 321 or the portion 312, the portion 322 may be fed in a pulsation manner.

INDUSTRIAL APPLICABILITY

In this manner, according to the invention, since the consumption current can be reduced to a large extent as compared with the method of the related art, the life time of the backup power supply can be elongated. Thus, a product, on which an absolute multi-revolution encoder employing the system of the invention is mounted, can be used continuously for a long time. Thus, the invention can be applied to industrial machines which are used in plant systems or production line systems that are required to be operated continuously for a long term.

The invention claimed is:

1. An absolute multi-revolution encoder comprising: a rotary disc;
a multi-revolution signal generation portion; and
a within-one-revolution signal generation portion, wherein
the rotary disc includes a magnetic material member which generates a multi-revolution signal, and
the multi-revolution signal generation portion includes
an A-phase magnetic field detection element and a B-phase magnetic field detection element which detect leakage fluxes of the magnetic material member and output signals of one pulse/revolution having phases different by 90 degrees there between,
an A-pulse generation portion including an A-phase detection portion which detects a signal from the A-phase, magnetic field detection element and an A-pulse generation circuit which converts the detected signal into an A pulse of a rectangular wave shape,
a B-pulse generation portion including a B-phase detection portion which detects a signal from the B-phase magnetic field detection element and an B-pulse generation circuit which converts the detected signal into a B pulse of a rectangular wave shape,
a counter which counts the A pulse and the B pulse to generate the multi-revolution signal, and
a power supply means which supplies power from a backup power supply for a determined time period to at least one of the B-phase detection portion and the B-pulse generation circuit based on the A pulse or to at least one of the A-phase detection portion and the A-pulse generation circuit based on the B pulse.

2. The absolute multi-revolution encoder according to claim 1, wherein
at least one of the A-phase magnetic field detection element and the B-phase magnetic field detection element is an MR element.

3. An absolute multi-revolution encoder comprising: a rotary disc;
a multi-revolution signal generation portion; and a within-one-revolution signal generation portion, wherein
the rotary disc includes a magnetic material member which generates a multi-revolution signal,
the magnetic material member is formed of a permanent magnetic which is magnetized along a direction perpendicular to a rotation axis of the rotary disc, and
the multi-revolution signal generation portion includes:
an A-phase magnetic field detection element and a B-phase magnetic field detection element which detect leakage fluxes of the magnetic material member and output signals of one pulse/revolution having phases different by 90 degrees there between,
an A-pulse generation portion including an A-phase detection portion which detects a signal from the A-phase magnetic field detection element and an A-pulse generation circuit which converts the detected signal into an A pulse of a rectangular wave shape,
a B-pulse generation portion including a B-phase detection portion which detects a signal from the B-phase magnetic field detection element and an B-pulse generation circuit which converts the detected signal into a B-pulse of a rectangular wave shape,
a counter which counts the A pulse and the B-pulse: to generate the multi-revolution signal,
a T-phase magnetic field detection element which detects leakage fluxes of the magnetic material member and outputs a signal of two pulses/revolution,
a T-pulse generation portion including a T-phase detection portion which detects a signal from the T-phase magnetic field detection element and a T-pulse generation circuit which converts the detected signal into a T pulse of a rectangular wave shape, and
a power supply means which supplies power from a backup power supply for a predetermine time period based on the T pulse to one of a following cases:
a) both of the A-phase detection circuit and the B-phase detection circuit,
b) both of the A-pulse generation circuit and the B-pulse generation circuit, and
c) all of the A-phase detection circuit, the B-phase detection circuit, A-pulse generation circuit and B-pulse generation circuit.

4. The absolute multi-revolution encoder according to claim 3, wherein
each of the A-phase magnetic field detection element and the B-pulse magnetic field detection element is a Hall element, and
the T-phase magnetic field detection element is an MR element.

5. The absolute multi-revolution encoder according to claim 3, wherein
a circuit board is disposed in parallel to the rotary disc via a gap,
the A-phase magnetic field detection element and the B-phase magnetic field detection element are mounted on the rotary disc side of the circuit board, and
the T-phase magnetic field detection element is mounted on a side of the circuit board in opposite to the rotary disc side.

* * * * *